(12) United States Patent
Librizzi

(10) Patent No.: US 6,885,176 B2
(45) Date of Patent: Apr. 26, 2005

(54) PWM CONTROL CIRCUIT FOR THE POST-ADJUSTMENT OF MULTI-OUTPUT SWITCHING POWER SUPPLIES

(75) Inventor: Fabrizio Librizzi, Gravina Di Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 57 days.

(21) Appl. No.: 10/601,008

(22) Filed: Jun. 20, 2003

(65) Prior Publication Data

US 2004/0046536 A1 Mar. 11, 2004

(30) Foreign Application Priority Data

Jun. 21, 2002 (IT) ..................................... TO2002A0545

(51) Int. Cl.[7] .............................................. G05F 1/56
(52) U.S. Cl. ...................... 323/285; 323/288; 323/299; 363/89
(58) Field of Search ................................ 323/282, 283, 323/285, 288, 299; 363/89

(56) References Cited

U.S. PATENT DOCUMENTS

| | | | | |
|---|---|---|---|---|
| 4,823,070 A | * | 4/1989 | Nelson | ........................ 323/285 |
| 5,424,932 A | * | 6/1995 | Inou et al. | ................ 363/21.06 |
| 6,130,828 A | | 10/2000 | Rozman | ....................... 363/21 |
| 6,222,747 B1 | | 4/2001 | Rinne et al. | ................... 363/89 |
| 6,239,994 B1 | * | 5/2001 | Abdoulin | ....................... 363/89 |
| 6,452,369 B1 | * | 9/2002 | Lang | ........................... 323/285 |
| 6,788,554 B1 | * | 9/2004 | Havanur | ................... 363/21.06 |

OTHER PUBLICATIONS

UNITRODE Corporation, Texas Instruments Incorporated, 1999, "Switch Mode Secondary Side Post Regulator", Nov. 1999.

* cited by examiner

Primary Examiner—Jeffrey Sterrett
(74) Attorney, Agent, or Firm—Lisa K. Jorgenson; Allen, Dyer, Doppelt, Milbrath & Gilchrist, P.A.

(57) ABSTRACT

A multi-output switching power supply may include a PWM regulator circuit arranged in cascade upstream of each output to receive, as an input, a square wave voltage signal with a predetermined duty cycle. The regulator circuit may include an auxiliary switching device for modulating the duty cycle of the input signal to supply, as an output, a regulated direct current voltage. A control circuit for the PWM regulator circuit may include a detector circuit for detecting the trailing edges of the voltage signal input to the regulator circuit which emits a pulse coinciding with each of the trailing edges. The control circuit may also include a ramp signal generator that is controlled by the emitted pulses. The ramp signal generator may be connected to the non-inverting input of a comparator having an inverting input for receiving a signal indicative of the error in the regulator output voltage.

23 Claims, 6 Drawing Sheets

PWM CONTROL CIRCUIT FOR THE POST-ADJUSTMENT OF MULTI-OUTPUT SWITCHING POWER SUPPLIES

FIELD OF THE INVENTION

The present invention relates to power supplies, and, more particularly, to switching power supplies having a plurality of outputs each provided with a respective pulse-width modulation (PWM) regulator and control circuits therefore.

BACKGROUND OF THE INVENTION

Many electronic devices require two or more isolated, stable and precisely regulated supply voltages. For example, microprocessors require a precise supply voltage of 3.3V or less, together with a conventional supply voltage of 5V. As these devices reach ever-smaller dimensions, they require increasingly higher power and higher operating efficiency. The trend of reducing component dimensions, combined with the trend of providing increasing numbers of precision supply voltages, leads to considerable difficulties in selecting suitable low cost circuits for a given purpose that can provide high energy-conversion efficiency and which have a relatively simple construction.

A typical prior art switching power supply configuration is illustratively shown in FIG. 1. A primary circuit 10 including at least one switch controlled by a pulse-width modulated square wave signal is connected to a plurality of loads $LD_1$, $LD_2$, $LD_3$ via respective secondary circuits 12. The secondary circuits 12 may be buck converters, for example, which are well known to those skilled in the art.

The main supply output with respect to the load $LD_1$ is regulated by a feedback path to the primary 10 which includes a PWM control circuit 14 for modulating the pulse width of the switch control signal at a fixed frequency. The control circuit 14 regulates the output voltage $V_{O1}$ by countering variations in the load $LD_1$ or in the input voltage $V_{in}$.

A variation in the input voltage is compensated by the effect of the PWM regulation on all of the outputs. In contrast, a variation in the load $LD_2$, $LD_3$, which causes alterations in the output voltages $V_{O2}$ and $V_{O3}$ cannot be taken into account by the PWM control circuit 14, since the two outputs are in an open-loop configuration.

To regulate the output voltages $V_{O2}$ and $V_{O3}$ when there are variations in the load, a regulator circuit 16 is arranged in cascade for each output voltage. Prior art approaches for constructing regulator circuits in cascade include linear regulators, cascaded DC/DC converters, and magnetic amplifiers.

A linear regulator is relatively simple, inexpensive, and easy to design. One significant disadvantage thereof is its low efficiency. For this reason, linear regulators are primarily used exclusively in low current applications.

DC/DC converters arranged in cascade with the output have performance advantages in terms of efficiency, voltage regulation, and permissible current. However, they are disadvantageous from a cost standpoint since a DC/DC converter requires the use of power switches, inductors, capacitors, and control circuits. Moreover, the introduction of such a converter gives rise to additional noise and produces a ripple in the output current. This ripple has to be corrected by filters, or by synchronizing the regulator with the main PWM control circuit.

Magnetic amplifiers can be described as regulators in cascade with programmable delay switches and are the most common choice for medium and high-power cascade regulators. The main component of such regulators is a reactive component which can be saturated to act as a magnetic switch, since it has high impedance when non-conductive and low impedance when saturated.

The magnetic amplifier achieves a desired control and regulation function and is a relatively simple circuit. It also provides safe performance with large loads. Yet, with a low load or no load, on the other hand; regulation is less efficient. Further disadvantages are that it provides limited switching frequency and may be rather large or bulky to implement.

An effective approach within a wide power range for multi-output switching power supplies and, in particular, in medium or high-power applications, is the cascaded PWM regulator. This regulator includes an auxiliary switching device (generally, but not exclusively, a MOSFET power transistor) controlled by a PWM signal. The PWM signal is generated by a control circuit synchronized with the main PWM control circuit 14.

The regulator preferably works by time modulation of the leading edge of the PWM control signal over time. The auxiliary switch blocks propagation of the voltage signal established in the secondary winding to the output of the power supply. The control circuit of the cascade regulator synchronizes the conduction periods of the main circuit switch and the auxiliary switch with the trailing edges of the respective square-wave control signals.

The advantages of this regulator over magnetic amplifier regulators are lower cost, smaller dimensions greater reliability, and better performance. The circuits required to control the switch may be complex, but they may be integrated in a single chip which helps to offset this complexity.

The operation of a control circuit for a cascaded PWM regulator is similar to that of a voltage converter/reducer (i.e., a buck converter). That is, it controls a switch device that is suitable for blocking an input voltage for a predetermined period of time, producing at the output a duty cycle less than that present at the input. The voltage value at the output consequently depends on the feedback loop of the control circuit, which controls the conduction or non-conduction of the switch.

Examples of PWM regulator circuits connected in cascade are described, for example, in U.S. Pat. Nos. 6,130,828 and 6,222,747. The '828 patent, which is assigned to Lucent Technologies, relates to a multi-output converter with self-synchronized pulse-width modulated regulation. The PWM control signal of the auxiliary switch associated with the regulator is generated by direct control of a driver circuit with input hysteresis by a ramp signal. This signal is generated by an integrator circuit disposed downstream from a circuit for amplifying the voltage error present at the regulated output. The amplitude of the signal thus depends on the output voltage error to be compensated by the regulator.

The '747 patent, which is assigned to Artesyn Technologies, relates to a control circuit connected in cascade in a multi-output switching power supply. The circuit described therein includes a synchronous pulse generator arranged to detect the trailing edge of the voltage established in the secondary transformer winding. A ramp signal generator is controlled by the pulses emitted from the pulse generator. The ramp signal generator is connected to the non-inverting input of a comparator, the inverting input of which receives a signal that is indicative of the output-voltage error. This signal is emitted by an error amplifier circuit that can compare the voltage at the output of the regulator with a predetermined internal reference voltage.

The ramp signal is reset and triggered at the same moment in time, which coincides with the trailing edge of the voltage in the secondary transformer winding. A theoretical duty cycle to be achieved in controlling the auxiliary switching device is 100%. That is, an operative condition in which the switching device is always conducting is envisaged.

SUMMARY OF INVENTION

An object of the present invention is to provide a PWM regulator which has a relatively simple and inexpensive circuit construction.

These and other objects, features, and advantages are provided by a control circuit for a PWM regulator circuit. The PWM regulator circuit may receive a square wave signal having a duty cycle and provide a regulated direct current (DC) signal at an output thereof. The PWM regulator circuit may include a switching device for modulating the duty cycle of the square wave signal. The control circuit may include a detector for detecting trailing edges of the square wave signal and providing a reset signal based thereon. Also, a ramp signal generator may be connected to the detector for generating a ramp signal based upon leading edges of the square wave signal, and for resetting the ramp signal based upon the reset signal.

Additionally, the control circuit may also include a first comparator connected to the output of the PMW regulator circuit for comparing the regulated DC signal with a reference signal and providing an error signal based thereon. A second comparator may also be included for comparing the ramp signal with the error signal and providing a PMW signal based thereon. Moreover, the control circuit may further include a driver for driving the switching device of the PWM regulator circuit. In particular, the driver may receive the PWM signal and provide a driving signal for driving the switching device based thereon to control a conduction interval thereof. The driving signal may have a duty cycle less than or equal to the duty cycle of the square wave signal, and it may also have trailing edges coinciding with the trailing edges of the square wave signal.

More particularly, the first and second comparators may include error amplifiers. Further, the second comparator may provide the PWM signal when the ramp signal is greater than the error signal. By way of example, the driver may include a bistable circuit having a first input for receiving the PWM signal and a second input for receiving the reset pulse. In addition, the control circuit may further include a delay element connected to the second input of the bistable circuit for delaying the reset signal. In particular, the bistable circuit may be a set-reset (S-R) flip-flop, where the first input of the S-R flip-flop is a set input, and the second input of the S-R flip-flop is a reset input.

BRIEF DESCRIPTION OF THE DRAWINGS

Further characteristics and advantages of the invention will be explained in greater detail in the following detailed description of an embodiment thereof, which is provided by way of non-limiting example with reference to the appended drawings, in which.

DETAILED DESCRIPTION OF THE PREFERRED EMBODIMENTS

Figure 1:
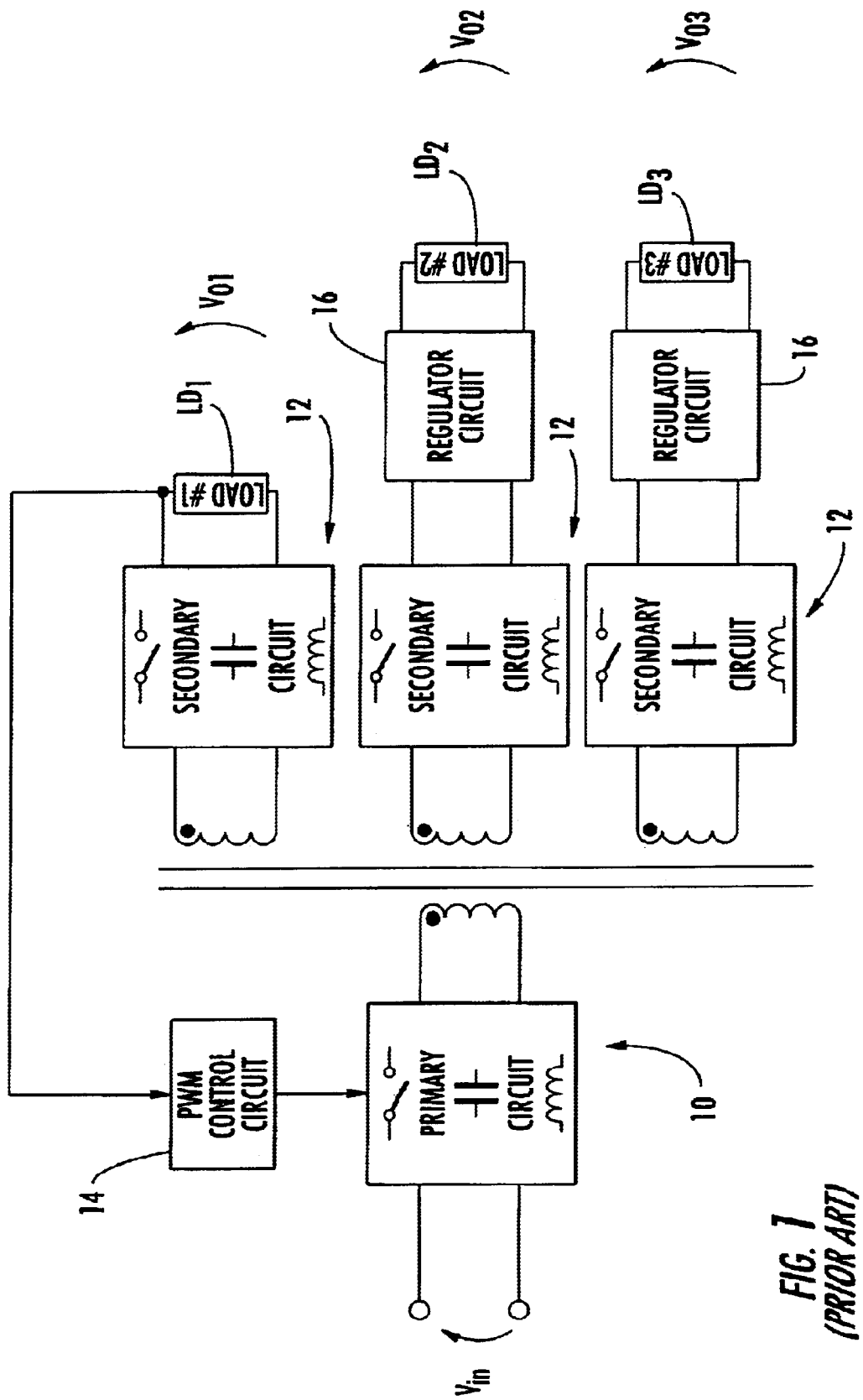
FIG. 1 (previously described) is a schematic circuit diagram of a regulated, multi-output power supply of the prior art.
Figure 2:
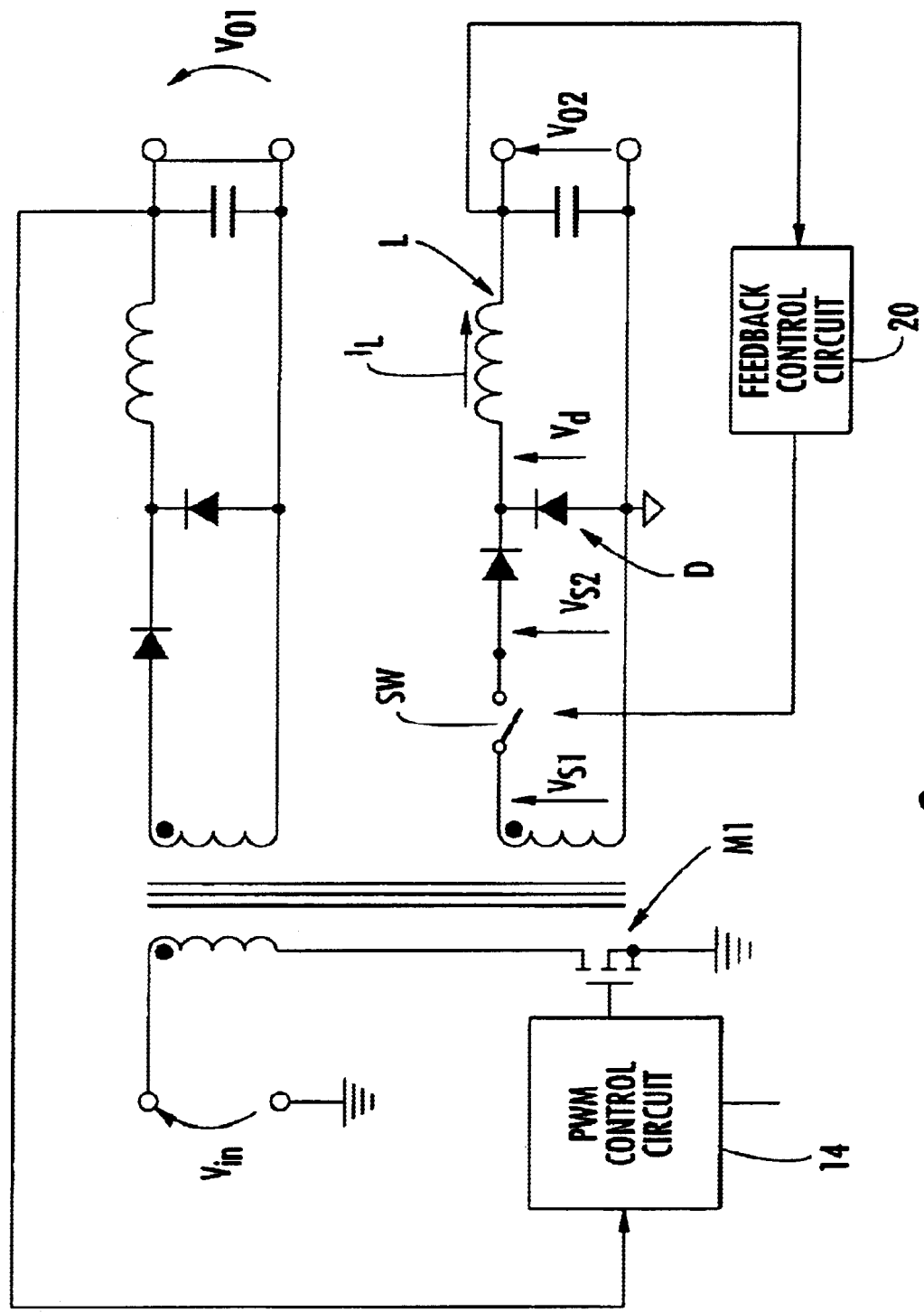
FIG. 2 is a schematic circuit diagram of a portion of the power supply of FIG. 1, provided with a cascade pulse-width modulated regulator and control circuit in accordance with the present invention.

With reference to FIG. 2, a PWM cascaded regulator for multi-output power supplies in accordance with the present invention is now described. The voltage signal $V_{S1}$ is established in the secondary winding of the power-supply transformer. The regulator includes an auxiliary switching device SW, and the voltage signal $V_{S2}$ is downstream of the switch.

When the switch SW is made non-conductive, it blocks the propagation towards the output filter LC of the voltage signal $V_{S1}$ present in the secondary transformer winding. When the switch SW is made conductive, the voltage $V_{S1}$ is established almost unchanged at the terminals of the diode D.

The voltage signal $V_d$ at the terminals of the diode D is thus a pulse width modulated waveform suitable for producing a direct current output via the filter LC. The pulse width of $V_d$ is controlled by the duty cycle of the main switch M1 of the primary winding and by the operation of the auxiliary switch SW. The main output $V_{O1}$ is regulated by the PWM control circuit 14, and the output $V_{O2}$ is regulated by the operation of a feedback control circuit 20.

Figure 3:
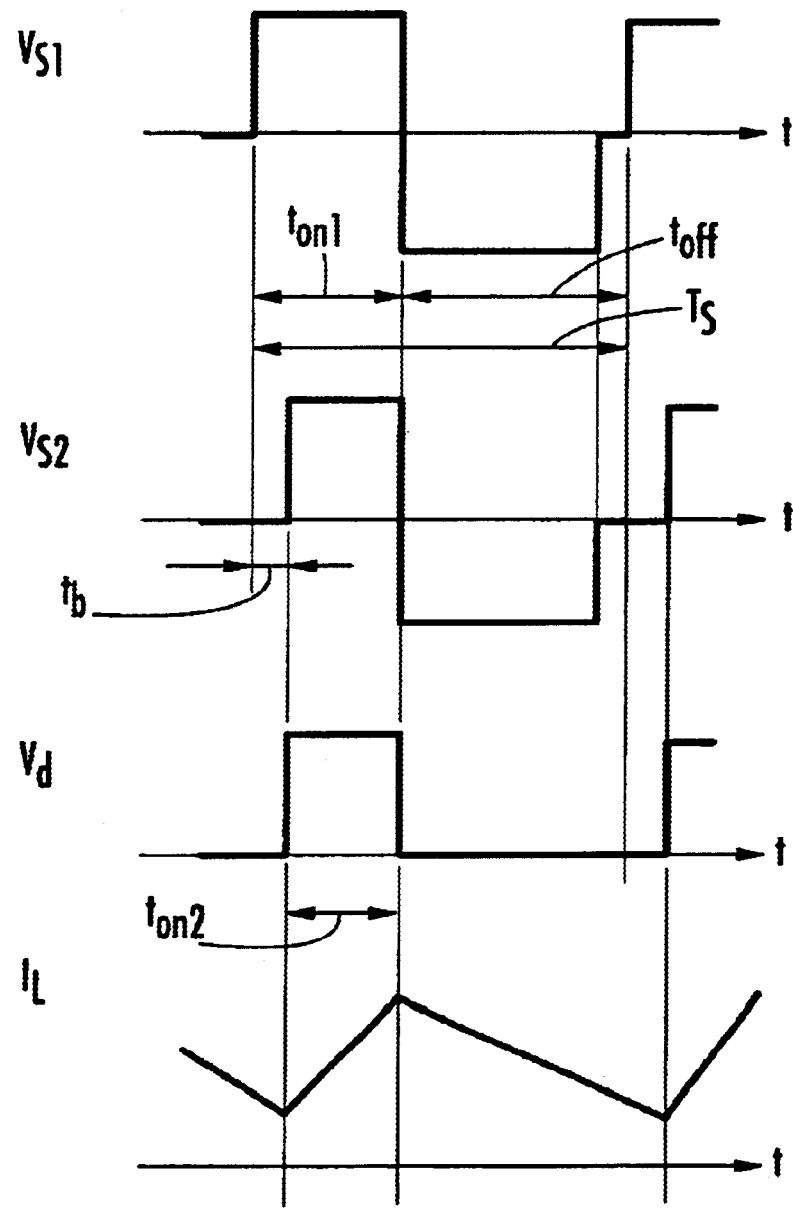
FIGS. 3 and 4 are timing diagrams showing two series of waveforms that are indicative of the behavior over time of certain electrical quantities of the regulator circuit of FIG. 2, in two different modes of operation.

Turning now to FIG. 3, the waveforms of the signals $V_{S1}$, $V_{S2}$, $V_d$ of the PWM regulator (from which the state of the associated switch SW can be inferred), and of the current passing through the inductor L in a continuous-conduction mode of operation are illustratively shown. The conduction and non-conduction intervals of the primary switch M1 are indicated as $t_{on1}$ and $t_{off}$, respectively, and $T_S$, is the switching period.

The interval during which the auxiliary switch SW is non-conductive is indicated as $t_b$. The time interval during which the auxiliary switch SW is conductive and the transfer of power takes place between the input and output is indicated as $t_{on2}$. The positive voltage $V_d$ brings about an increase in the inductor current $I_L$, whereas an absence of voltage brings about the discharge of the inductor. The auxiliary switch SW is thus non-conductive during the interval $t_{off}+t_b$.

Figure 4:
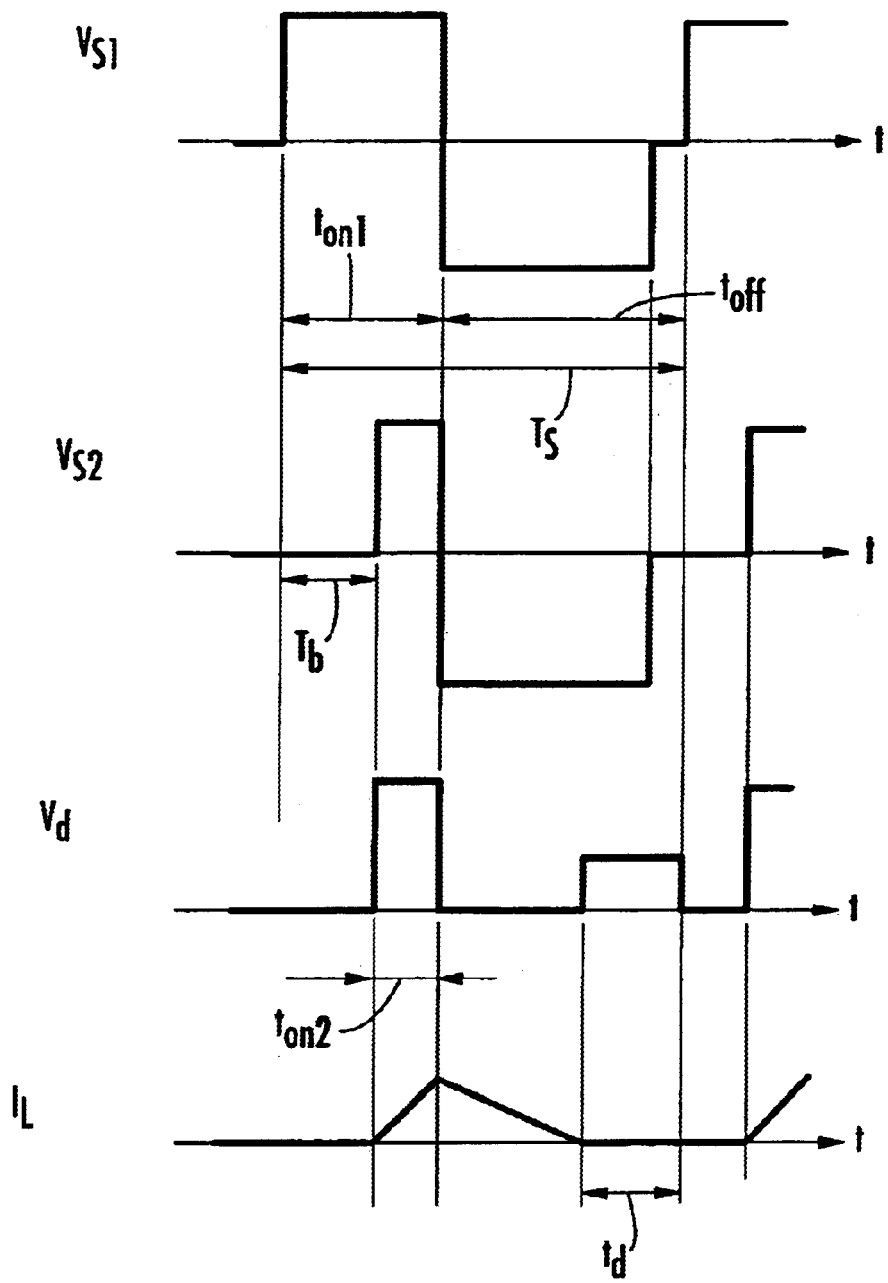

The mode of operation with discontinuous inductor conduction, to which the foregoing discussion also applies, is shown in FIG. 4. If the parasitic elements are ignored, a positive voltage equal to $V_{O2}$ appears as the voltage $V_d$ in the time interval $t_d$, during which the inductor current is zero.

Figure 5:
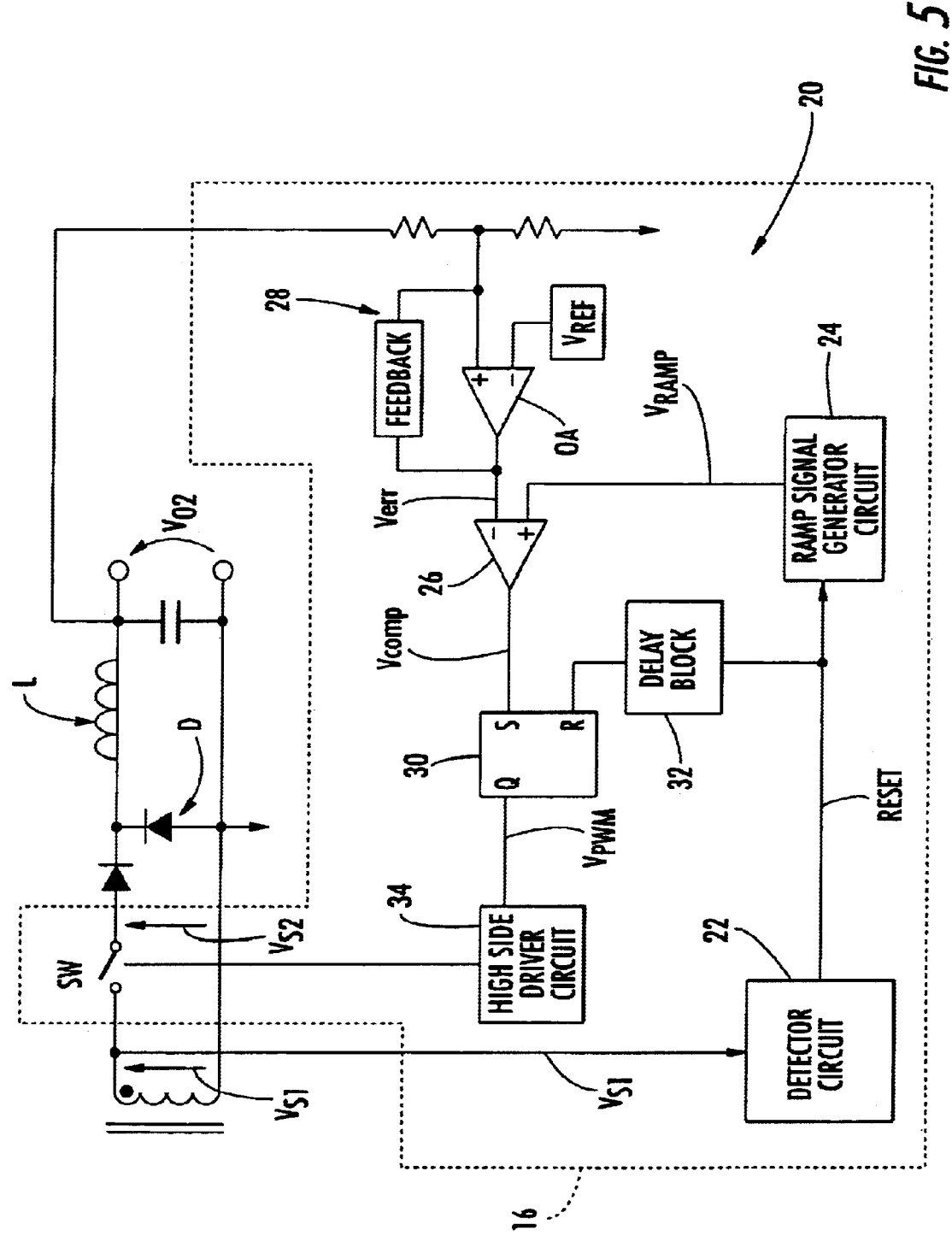
FIG. 5 is a schematic circuit diagram illustrating the control circuit of FIG. 2 in greater detail.

With reference to FIG. 5, the control circuit 20 according to the invention comprises a detector circuit 22 for detecting the trailing edge of the square wave voltage signal $V_{S1}$, which is present at the terminals of the secondary transformer winding. A ramp-signal generator circuit 24 is connected to the output of the detector circuit 22 and is connected, by way of its own output, to the non-inverting input of a comparator 26. The inverting input thereofreceives a signal from an error amplifier circuit 28 connected to the output of the power supply.

The error amplifier circuit 28 includes an operational amplifier OA in a non-inverting configuration. The output voltage $V_{O2}$ of the power supply is fed back from the output to the non-inverting input terminal and is compared with a predetermined reference voltage $V_{REF}$ applied to the inverting input terminal. It should be noted that this is in contrast to what is described in the above-noted references.

The output of the comparator 26 is connected to a set input S of a bistable circuit 30, such as an S-R flip-flop. The reset input R thereof receives the signal emitted by the detector circuit 22 after it has passed through a delay block 32 (e.g., a conventional delay line). The operation of the bistable circuit 30 is regulated in accordance with the following truth table:

| S | R | Q |
|---|---|---|
| 0 | 0 | $Q_{prec}$ |
| 1 | 0 | 1 |
| 0 | 1 | 0 |
| 1 | 1 | 1 |

The direct output Q of the flip-flop 30 is connected to a high-side driver circuit 34 for driving the switch SW, which may be formed as a bipolar transistor or, preferably, as a power MOSFET.

Figure 6:
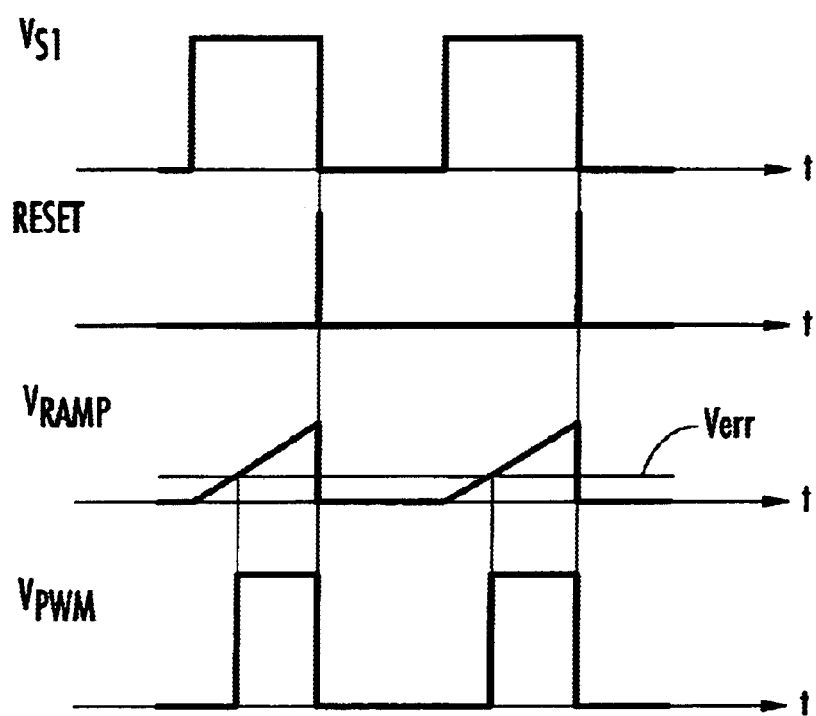
FIG. 6 is a timing diagram showing a series of waveforms illustrating certain electrical quantities of the control circuit shown in FIG. 5.

Referring now to the timing diagram of FIG. 6, the square wave voltage signal $V_{S1}$, at the terminals of the secondary transformer winding is supplied as an input to the detector circuit 22. This circuit generates a pulse coinciding with each trailing edge of the waveform of the voltage $V_{S1}$. This pulsed signal is indicated as RESET in the drawings and is supplied as an input to the ramp generator circuit 24 and to the delay block 32.

The ramp generator circuit 24 triggers the generation of a ramp signal $V_{ramp}$ with each leading edge of the signal $V_{S1}$, and it resets its own output when it receives the RESET pulses which are synchronous with the trailing edges of $V_{S1}$. The overall signal $V_{ramp}$ over time has a sawtooth-like waveform, as illustratively shown. The signal $V_{err}$ emitted by the error amplifier circuit 28 is applied to the inverting input of the comparator 26 and compared with the signal $V_{ramp}$ emitted by the ramp generator circuit 24.

The comparator circuit 26 generates at its own output a square wave signal $V_{comp}$ (not shown) which is positive when $V_{ramp}$ is greater than $V_{err}$, and which has a duty cycle less than that of the voltage signal $V_{S1}$. The signal $V_{comp}$ is applied to the set input S of the bistable circuit 30 to establish, at its output, a control signal $V_{PWM}$ for the driver circuit 34 of the switch SW.

The S-R bistable circuit 34 causes operation to be at a constant frequency if the waveforms $V_{ramp}$ and $V_{err}$ do not intersect at any point. The delay block 32 is interposed in the path of the RESET signal before the reset input R of the bistable 34 so that the switching of the reset signal to a low logic level takes place only after the signal $V_{comp}$ emitted by the comparator circuit 26 to the set input S of the bistable circuit has also reached a low logic level.

The signal $V_{PWM}$ for driving the switch SW therefore also has a duty cycle less than that of the signal $V_{S1}$, with modulation of the leading edge over time and with the trailing edges coinciding. When the voltage value of the signal $V_{err}$ relating to the error in the power supply output voltage is less than the voltage value of the signal $V_{ramp}$, the duty cycle of the driving signal $V_{PWM}$ is equal to the duty cycle of the signal $V_{S1}$.

Advantageously, resetting of the ramp signal coincides with the trailing edge of the voltage signal in the secondary transformer winding. Yet, its triggering coincides with the leading edge of the voltage signal in the secondary winding. This is in contrast to the circuit described in U.S. Pat. No. 6,222,747, in which its resetting and triggering take place at the same moment, coinciding with the trailing edge.

The maximum duty cycle that can be reached in the control of the auxiliary switch is equal to the duty cycle of the primary circuit. The amplitude of the ramp signal generated is fixed and depends on the configuration of the generator circuit 24 used, and not on the error in the voltage output by the power supply as described in U.S. Pat. No. 6,130,828.

With respect to the circuit described in the '828 patent, the ramp signal for controlling the auxiliary switch is reset by superimposing the signal $V_{S1}$ of the voltage in the secondary transformer winding. By contrast, the control circuit 20 of the present invention makes use of the circuit 22 for detecting the trailing edges of the voltage $V_{S1}$ to control the resetting of the ramp signal with instantaneous precision.

Moreover, in the circuit according to the present invention, the ramp signal is synchronized with the voltage signal $V_{S1}$ by the trailing edge detector circuit 22. Yet, in the circuit described in the '828 patent, this takes place by way of a freewheeling diode connecting the integrator circuit to the high voltage terminal of the secondary transformer winding.

The control circuit according to the invention advantageously enables common-cathode diodes, which are in widespread use and are readily obtainable at low cost, to be used for the construction of the voltage converter/reducer configuration in the secondary winding of the power supply. The power inductor of the voltage converter/reducer can be arranged either in the positive voltage branch or in the ground branch. This is in contrast with many prior art regulators for switching power supplies that allow for arrangement solely in the ground branch, such as, for example, the Unitrode devices produced by Texas Instruments and sold under the part numbers UCC1583/4, UCC2583/4, UCC3583/4.

The exemplary configuration described above may also be used in a power supply with a transformer having only one secondary winding for serving two outputs. One of the outputs is controlled by the primary PWM control circuit, and the other is controlled by a PWM regulator in cascade.

Since the control circuit according to the present invention has an error amplifier circuit having the reference voltage applied to its own inverting input, unlike the circuits of the prior art, it does not need an output inverter device. Consequently, it may be produced with the use of a smaller number of components.

Of course, the principle of the invention remaining the same, the forms of embodiments and details of construction may be varied widely with respect to those described and illustrated herein purely by way of non-limiting example, without departing from the scope defined in the following claims.

That which is claimed is:

1. A PWM regulator for receiving a square wave signal having a duty cycle and providing a regulated direct current (DC) signal at an output thereof and comprising:

a switching device for modulating the duty cycle of the square wave signal; and a control circuit for controlling said switching device and comprising a detector for detecting trailing edges of the square wave signal and providing a reset signal based thereon, a ramp signal generator connected to said detector for generating a ramp signal based upon leading edges of the square wave signal, and for resetting the ramp signal based upon the reset signal, a first comparator connected to the output of the PMW regulator for comparing the regulated DC signal with a reference signal and providing an error signal based thereon, a second comparator for comparing the ramp signal with the error signal and providing a PMW signal based thereon, and a driver for receiving the PWM signal and providing a driving signal for driving said switching device .based thereon to control a conduction interval thereof, the driving signal having a duty cycle less than or equal to the duty cycle of the square wave signal and also having trailing edges coinciding with the trailing edges of the square wave signal.

2. The PWM regulator of claim 1 wherein said first comparator comprises an error amplifier.

3. The PWM regulator of claim 1 wherein said second comparator comprises an error amplifier.

4. The PWM regulator of claim 1 wherein said second comparator provides the PWM signal when the ramp signal is greater than the error signal.

5. The PWM regulator of claim 1 wherein said driver comprises a bistable circuit having a first input for receiving the PWM signal and a Second input for receiving the reset signal.

6. The PWM regulator of claim 5 wherein said control circuit further comprises a delay element connected to the second input of said bistable circuit for delaying the reset signal.

7. The PWM regulator of claim 5 wherein said bistable circuit comprises a set-reset (S-R) flip-flop; and wherein the first input of said S-R flip-flop comprises a set input, and the second input of said S-R flip-flop comprises a reset input.

8. A control circuit for a PWM regulator that receives a square wave signal having a duty cycle and provides a regulated direct current (DC) signal at an output thereof, the PWM regulator comprising a switching device for modulating the duty cycle of the square wave signal, the control circuit comprising:

detector means for detecting trailing edges of the square wave signal and providing a reset signal based thereon;

ramp signal generator means connected to said detector means for generating a ramp signal based upon leading edges of the square wave signal, and for resetting the ramp signal based upon the reset signal;

first comparator means connected to the output of the PMW regulator for comparing the regulated DC signal with a reference signal and providing an error signal based thereon;

second comparator means for comparing the ramp signal with the error signal and providing a PMW signal based thereon; and driver means for driving the switching device of the PWM regulator circuit, said driver means receiving the PWM signal and providing a driving signal for driving the switching device based thereon to control a conduction interval thereof, the driving signal having a duty cycle less than or equal to the duty cycle of the square wave signal and also raving trailing edges substantially coinciding with the trailing edges of the square wave signal.

9. The control circuit of claim 8 wherein said first comparator means comprises an error amplifier.

10. The control circuit of claim 8 wherein said second comparator means comprises an error amplifier.

11. The control circuit of claim 8 wherein said second comparator means provides the PWM signal when the ramp signal is greater than the error signal.

12. The control circuit of claim 8 wherein said driver means comprises a bistable circuit having a first input for receiving the PWM signal and a second input for receiving the reset signal.

13. The control circuit of claim 12 further comprising a delay element connected to the second input of said bistable circuit for delaying the reset signal.

14. The control circuit of claim 12 wherein said bistable circuit comprises a set-reset (S-R) flip-flop; and wherein the first input of said S-R flip-flop comprises a set input, and the second input of said S-R flip-flop comprises a reset input.

15. A control circuit for a PWM regulator that receives a square wave signal having a duty cycle and modulates the duty cycle to provide a regulated direct current (DC) signal at an output thereof, the control circuit comprising:

a detector for detecting trailing edges of the square wave signal and providing a reset signal based thereon;

a ramp signal based upon leading edges of the for generating a ramp signal generator connected to said detector square wave signal, and for resetting the ramp signal based upon the reset signal;

a first comparator connected to the output of the PMW regulator for comparing the regulated DC signal with a reference signal and providing an error signal based thereon;

a second comparator for comparing the ramp signal with the error signal and providing a PMW signal based thereon; and a driver for controlling modulation of the square wave signal duty cycle, by the PWM regulator, said driver receiving the PWM signal and providing a driving signal based thereon, the driving signal having a duty cycle less than or equal to the duty cycle of the square wave signal and also having trailing edges substantially coinciding with the trailing edges of the square wave signal.

16. The control circuit of claim 15 wherein said first comparator comprises an error amplifier.

17. The control circuit of claim 15 wherein said second comparator comprises an error amplifier.

18. The control circuit of claim 15 wherein said second comparator provides the PWM signal when the ramp greater than the error signal.

19. The control circuit of claim 15 wherein said driver comprises a bistable circuit having a first input for receiving the PWM signal and a second input for receiving the reset signal.

20. The control circuit of claim 19 further comprising a delay element connected to the second input of said bistable circuit for delaying the reset signal.

21. The control circuit of claim 19 wherein said bistable circuit comprises a set-reset (S-R) flip-flop; and wherein the first input of said S-R flip-flop comprises a set input, and the second input of said S-R flip-flop comprises a reset input.

22. A method for modulating a duty cycle of a square wave signal to provide a regulated direct current (DC) signal using a switching circuit, the method comprising:

detecting trailing edges of the square wave signal and providing a reset signal based thereon;

generating a ramp signal based upon leading edges of the square wave signal and resetting the ramp signal based upon the reset signal;

comparing the regulated DC signal with a reference signal and providing an error signal based thereon; comparing the ramp signal with the error signal and providing a PMW signal based thereon; and controlling modulation of the square wave signal duty cycle by generating a driving signal for the switching circuit based upon the PWM signal, the driving signal having a duty cycle less than or equal to the duty cycle of the square wave signal and also having trailing edges substantially coinciding with the trailing edges of the square wave signal.

23. The method of claim 22 wherein providing the PWM signal comprises providing the PWM signal when the ramp signal is greater than the error signal.

* * * * *

UNITED STATES PATENT AND TRADEMARK OFFICE
CERTIFICATE OF CORRECTION

PATENT NO. : 6,885,176 B2
DATED : April 26, 2005
INVENTOR(S) : Fabrizio Librizzi It is certified that error appears in the above-identified patent and that said Letters Patent is hereby corrected as shown below:

Column 4,
Lines 65-66, delete "thereofre-ceives" insert -- thereof receives --.

Column 8,
Line 50, delete "ramp greater" insert -- ramp signal is greater --.

Column 9,
Lines 5-7, delete "thereon; comparing the ramp signal with the error signal and providing a PWM signal based thereon; and" insert
-- thereon;
    comparing the ramp signal with the error signal and providing a PWM signal based thereon; and --.

Signed and Sealed this

Sixth Day of September, 2005

JON W. DUDAS
*Director of the United States Patent and Trademark Office*